United States Patent [19]
Harris

[11] 3,774,979
[45] Nov. 27, 1973

[54] SNOWMOBILE TRACK WITH FRICTION REDUCING MEANS

[75] Inventor: Marvin W. Harris, Brainard, Minn.

[73] Assignee: Scorpion, Inc., Crosby, Minn.

[22] Filed: June 26, 1972

[21] Appl. No.: 266,296

[52] U.S. Cl............................. 305/24, 305/35 EB
[51] Int. Cl....B62d 55/24, B62d 55/10, B62m 27/02
[58] Field of Search.................. 305/35 EB, 37, 38, 305/24, 25; 180/5 R; 161/162, DIG. 5

[56] References Cited
UNITED STATES PATENTS

| | | | |
|---|---|---|---|
| 3,515,625 | 6/1970 | Sedlak | 161/DIG. 5 |
| 3,540,978 | 11/1970 | Ames | 161/DIG. 5 |
| 3,680,925 | 8/1972 | Spivy | 305/24 |
| 3,711,165 | 1/1973 | Russ | 305/35 EB |

OTHER PUBLICATIONS

B62m 27/02

Primary Examiner—Richard J. Johnson
Attorney—Frederick E. Lange et al.

[57] ABSTRACT

An improved snowmobile track embodying a means for reducing the sliding friction between the inner surface of the track and a track supporting means. The friction reducing means includes a plurality of relatively small, hard beads partially embedded into a portion of the inner surface of said track for slidably engaging said track supporting means.

9 Claims, 5 Drawing Figures

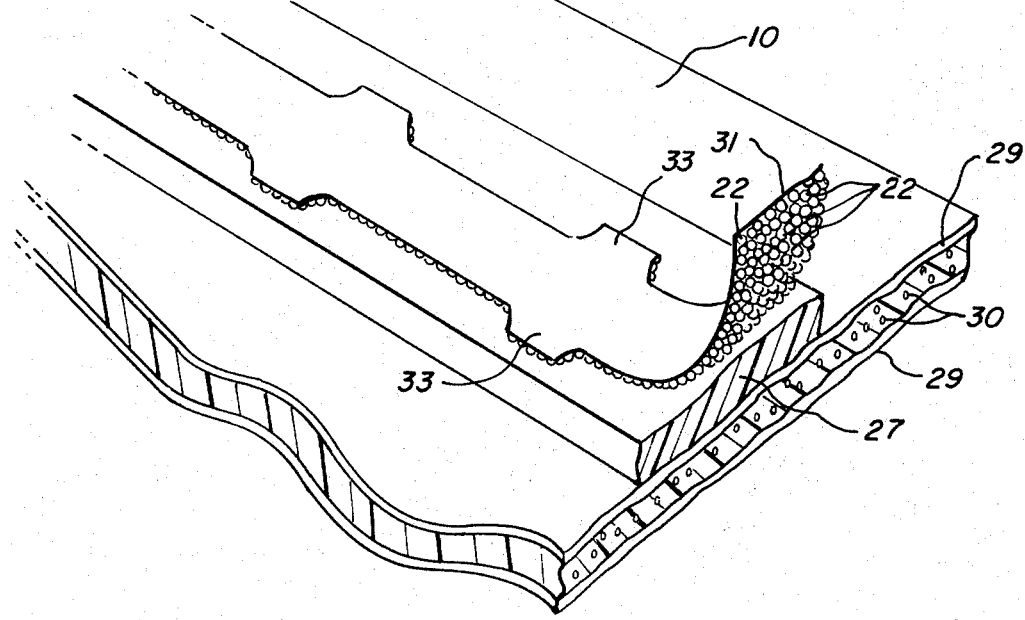
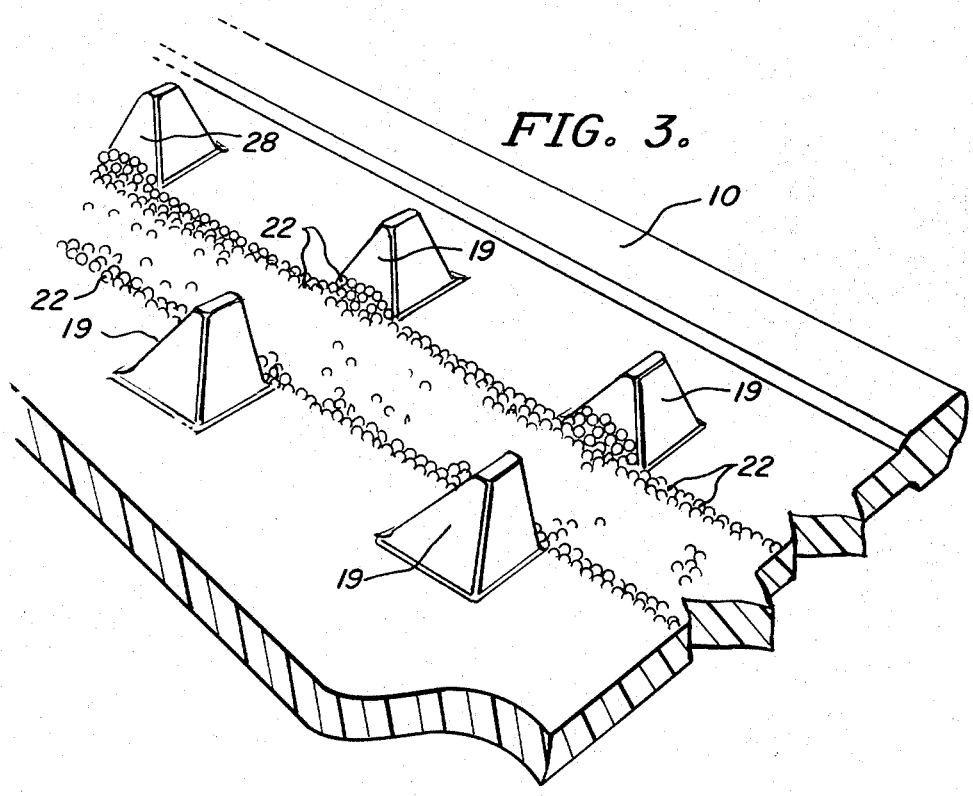

SNOWMOBILE TRACK WITH FRICTION REDUCING MEANS

BACKGROUND OF THE INVENTION

The present invention relates generally to an improved surface bearing and more specifically, to an improved means for reducing the sliding friction between the track of an endless track vehicle and the track supporting structure.

In a conventional endless track vehicle such as a snowmobile, the track extends around and between a forward and a rearward pair of sprockets and is commonly supported between the sprockets on the inner surface of the track by a pair of slide rails which is resiliently mounted and relatively stationary with respect to the vehicle body. The slide rails slidably engage a portion of the inner surface of the track during the movement of the track between the sprockets. Unless measures are taken to reduce the sliding friction between the slide rail and the track, the track and/or the slide rail would soon wear out.

In the past, friction was reduced by molding strips of metal or various types of self lubricating materials into the snowmobile track for engagement with a portion of the sliderail. Although these structures functioned reasonably well in heavy, loose snow where the snow served as an additional lubricant, their use was restricted when the snow was packed or lacking. Even in the heavy, loose snow, the efficiency of the friction reducing means was limited because of the relatively large surface area of the friction reducing strips.

SUMMARY OF THE INVENTION

In contrast to the prior art, the present invention provides for a unique means for reducing the sliding friction between the track of a vehicle such as a snowmobile and the stationary track support. More specifically, the present invention contemplates reducing this friction by reducing the surface area of contact between the track and the slide rail. Basically, this is accomplished by embedding a plurality of tiny beads into the track in the area of the track which contacts the slide rail. These beads are constructed from a relatively hard, ceramic material and have a relatively low coefficient of friction.

Consequently, an object of the present invention is to provide an improved friction reducing means for use with a vehicle such as a snowmobile for reducing the sliding friction between the snowmobile track and the slide rail.

Another object of the present invention is to provide a friction reducing means for a snowmobile track which includes embedding a plurality of tiny beads in the snowmobile track for slidably engaging a portion of the track supporting means.

A further object of the present invention is to provide a means for reducing the sliding friction between a snowmobile track and a slide rail which will function adequately well in virtually all types of snow conditions.

DESCRIPTION OF THE DRAWINGS

FIG. 3 is a perspective view of a portion of a snowmobile track embodying the features of the present invention.

FIG. 5 is a perspective view of a portion of a layed-up snowmobile track prior to curing.

DESCRIPTION OF THE PREFERRED EMBODIMENT

Figure 1:
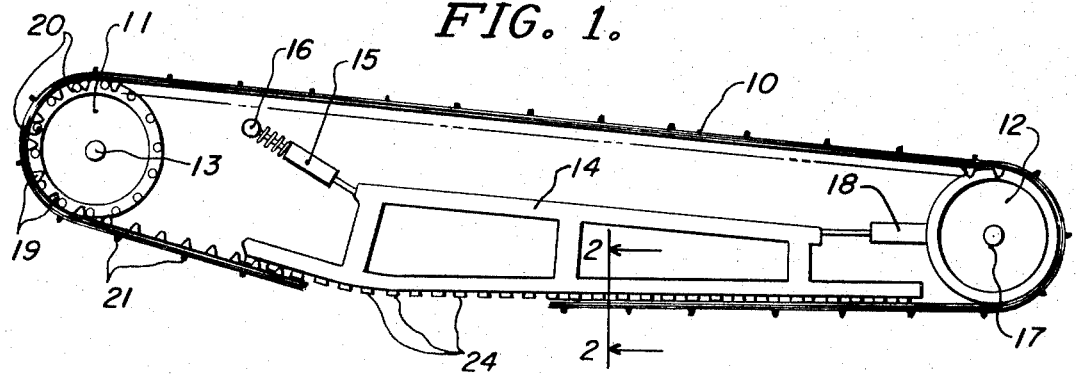
FIG. 1 is a side view of the track supporting apparatus of a conventional snowmobile.

Reference is first made to FIG. 1 which is a side view of a conventional support system for a snowmobile track. More specifically, the snowmobile track 10 is illustrated as being supported at its forward end by a pair of front drive sprockets 11, at its rearward end by a pair of rear idler sprockets 12 and in its center portion by a track supporting means in the form of a pair of laterally spaced slide rails 14. It should be noted that only one of the front sprockets 11, rear sprockets 12 and slide rails 14 is shown. The pair of front sprockets 11 and the pair of rear sprockets 12 are rotatably supported respectively by a front axle 13 and a rear axle 17 extending normal to the longitudinal axis of the snowmobile body. Although not shown, the rear axle 17 is commonly resiliently supported with respect to the snowmobile body. Each of the slide rails 14 is resiliently supported at its forward end with respect to the snowmobile body by a front suspension means 15 which extends between the forward end of the slide rail 14 and a fixed point 16 on the snowmobile body. Likewise, the rear portion of each slide rail 14 is resiliently supported with respect to the snowmobile body by a rear suspension means 18 which extends between a rearward portion of the slide rail 14 and the rear axle 17.

The track 10 extends around and between the sprockets 11 and 12 and embodies a plurality of drive lugs 19 disposed on the inner surface of the track 10 to engage the drive prongs 20 on the front sprockets 11, and a plurality of transverse traction lugs 21 disposed on the outer surface of the track 10 and extending transversely across the width of the track for insuring traction between the track 10 and the surface of the ground.

Figure 2:
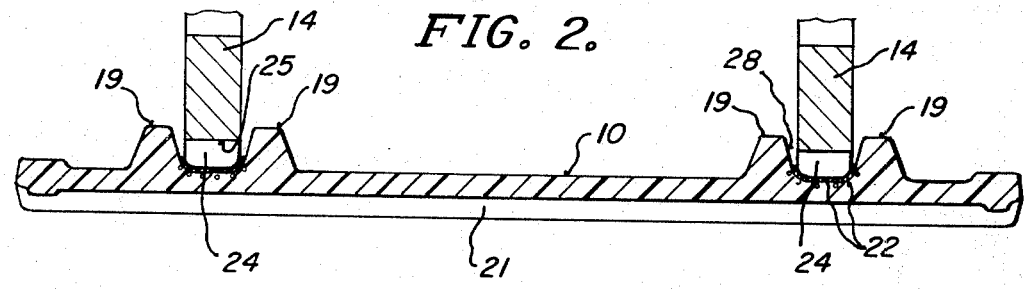
FIG. 2 is a cross-sectional view of the snowmobile track and slide rails as viewed along the line 2—2 of FIG. 1.
Figure 4:
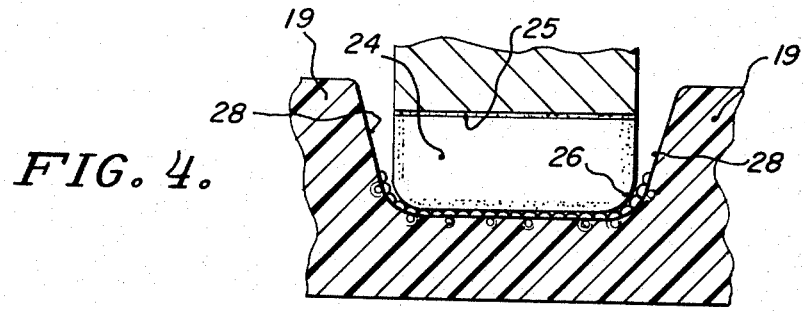
FIG. 4 is a cross-sectional view of a portion of a snowmobile track embodying the features of the present invention in engagement with the slide rail.

With reference to FIGS. 2, 3, and 4, the plurality of drive lugs 19 are disposed and spaced in a manner such that the surface 28 of each of the lugs 19 provides a longitudinal channel extending around the inner surface of the track 10 for each of the slide rails 14. Embedded in this longitudinal channel between each pair of drive lugs 19 and around the entire inner circumference of the track 10 are a plurality of tiny beads 22 which are constructed from a material which is relatively hard and which has a low coefficient of friction. It should be noted that in the preferred embodiment, each of the beads 22 is vulcanized directly into the snowmobile track with only a small portion of each extending above the surface of the track. Although the claim language states that a portion of each of the beads is exposed for slidable engagement with the track supporting means, this language is intended to cover a structure in which some of the beads may be completely embedded during the vulcanization process without a portion so exposed. During operation of the snowmobile, the beads 22 are designed to engage a contact surface of the track supporting means which comprises a plurality of slide tiles 24 connected with the bottom surface 25 of each slide rail 14. As best shown in FIG. 1, the plurality of slide tiles 24 are spaced along the entire length of each slide rail 14 for engagement with the beads 22. Similar to the beads 22 each of the slide tiles 24 is constructed from a relatively hard material which has a low coefficient of friction.

Although it is not a necessary requirement of the present invention, the slide tiles 24 and the beads 22 of the preferred embodiment are constructed from the same material. This material is a high alumina ceramic material which has a relatively high C rating on the Rockwell hardness scale. Although other materials may be used, the material used in the preferred embodiment is a material which is currently identified by the tradename METLX which is manufactured by Coors Porcelain Company of Golden Colorado.

In the preferred embodiment, the plurality of slide tiles 24 are securely fastened to the bottom of the slide rail 14 by bonding the tiles 24 directly to the metal slide rail surface. This is accomplished by first preparing the bottom metal surface 25 of the slide rail 14 for a metal-rubber bond, and then vulcanizing the tiles 24 directly to the metal surface 25. Because the tiny beads 22 are embedded in the track 10 throughout the entire inner circumference of the track, a relatively friction free surface is provided for engagement with the slide tiles 24. This is principally due to the much reduced surface area of the portion of the track engaging the tiles 24 and because of the relatively hard and low coefficient properties of the beads 22 and the tiles 24.

In FIGS. 2, 3 and 4, it can be seen that the beads 22, in addition to extending along the entire inner circumference of the track 10, are embedded in a portion of the surface 28 of each drive lug 19. This insures a friction free surface between the corners 26 of the tiles 24 and the inner surfaces 28 of the lugs 19.

Although there are a variety of ways in which the beads 22 can be embedded in the track surface, the present invention accomplishes this by vulcanizing the beads 22 into the track during the track curing process. With reference to FIG. 5, snowmobile tracks are commonly manufactured by first laying up the track on a lay-up drum or other lay-up apparatus. This lay-up process generally involves the placing of presized rubber slabs 29 on the lay-up drum together with a variety of other windings and materials 30. Then, a strip of rubber 27 about three inches wide is placed over the slab 29 in the area where the drive lugs 19 are to be formed. Finally, to provide the structure of the present invention, the beads 22 which are adhesively attached to a strip of material 31 are placed onto the upper surface of the rubber strip 27 as shown in FIG. 5 together with a suitable bonding agent so that the position of the tabs 33 of the strip 31 conform to the final position of the lugs 19. The layed-up track is then cured in a normal fashion with heat and pressure. This results in the beads 22 being completely embedded within the track surface. Following the curing step, the adhesive backed material 31 is removed, leaving the beads 22 embedded in the surface of the track 10. At this stage in the preparation of the track 10, very little of the surface of the beads 22 is exposed. Thus, the area of the track in which the beads 22 are embedded are buffed with an abrasive wheel until approximately 20–30 percent of the bead surface is exposed. When the buffing is finished, the track 10 is in the form illustrated in FIG. 3 and ready for use. Although the beads 22 may vary in size, the beads in the preferred embodiment are intended to be about 60 thousandths of an inch in diameter.

Although the Description of the Preferred Embodiment of the present invention has been quite specific, it is contemplated that various modifications may be made for the Preferred Embodiment without deviating from the spirit of the present invention. Therefore, it is intended that the scope of the present invention is dictated by the appended claims rather than by the Description of the Preferred Embodiment.

I claim:

1. An improved endless snowmobile track having an inner and an outer surface with a portion of said inner surface adapted for slidable engagement with a track supporting means, said track having a plurality of relatively small beads embedded into the portion of said inner surface adapted for slidable engagement with said track supporting means with a portion of each of said beads exposed for engagement with said track supporting means for reducing the sliding friction therebetween, each of said beads being composed of a relatively hard material and having a relatively low coefficient of friction.

2. The improved track of claim 1 wherein at least 20 percent but not more than 30 percent of each of said beads is exposed.

3. The improved track of claim 1 having a plurality of drive lugs defining the portion of said inner surface adapted for slidable engagement with said track supporting means.

4. The improved track of claim 3 wherein a plurality of relatively small beads are embedded into a portion of each of said drive lugs.

5. The improved track of claim 1 wherein said beads are composed of a ceramic material having a relatively high alumina content.

6. An improved means for reducing the sliding friction between the inner surface of a snowmobile track and a track supporting means comprising:
   a plurality of relatively small beads embedded into the inner surface of said track in the area adapted for slidable engagement with said track supporting means and a contact surface on said track supporting means, a portion of each of said beads being exposed for engagement with said contact surface for reducing the sliding friction therebetween, each of said beads and said contact surface being composed of a relatively hard material and having a relatively low coefficient of friction.

7. The improved friction reducing means of claim 6 wherein said contact surface comprises a plurality of tiles connected with said track supporting means.

8. The improved friction reducing means of claim 7 wherein each of said beads and tiles are composed of a ceramic material.

9. The improved friction reducing means of claim 6 wherein at least 20 percent but not more than 30 percent of each of said beads is exposed.

* * * * *